United States Patent
Kojima et al.

(10) Patent No.: US 7,967,724 B2
(45) Date of Patent: Jun. 28, 2011

(54) SHIFT MAP SWITCHING CONTROL UNIT

(75) Inventors: Hiroyuki Kojima, Wako (JP); Yoshiaki Nedachi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 508 days.

(21) Appl. No.: 11/925,113

(22) Filed: Oct. 26, 2007

(65) Prior Publication Data

US 2008/0161158 A1 Jul. 3, 2008

(30) Foreign Application Priority Data

Dec. 28, 2006 (JP) ................................. 2006-354910

(51) Int. Cl.
*F16J 59/60* (2006.01)
*G06F 19/00* (2006.01)

(52) U.S. Cl. ............................. 477/97; 477/900; 701/56

(58) Field of Classification Search .................... 477/34, 477/97, 900; 701/55, 56
See application file for complete search history.

(56) References Cited

U.S. PATENT DOCUMENTS

| | | | |
|---|---|---|---|
| 5,231,582 A | | 7/1993 | Takahashi et al. |
| 5,510,982 A | * | 4/1996 | Ohnishi et al. .................. 701/55 |
| 5,594,411 A | | 1/1997 | Ono |
| 6,342,683 B1 | | 1/2002 | Aoki et al. |
| 2004/0035630 A1 | * | 2/2004 | Lich et al. ...................... 180/271 |
| 2005/0090962 A1 | * | 4/2005 | Ota et al. ......................... 701/51 |
| 2007/0271017 A1 | * | 11/2007 | Samie .............................. 701/55 |

FOREIGN PATENT DOCUMENTS

| | | | | |
|---|---|---|---|---|
| DE | 103 37 212 A1 | 3/2005 | | |
| GB | 2200957 A | 8/1988 | | |
| JP | 62151655 A | * 7/1987 | ................... | 477/900 |
| JP | 63-254257 A | 10/1988 | | |
| JP | 01 116339 A | 5/1989 | | |
| JP | 02261957 A | * 10/1990 | ................... | 477/901 |

OTHER PUBLICATIONS

European Search Report from the European Patent Office dated Feb. 4, 2008.

* cited by examiner

*Primary Examiner* — Roger Pang
(74) *Attorney, Agent, or Firm* — Westerman, Hattori, Daniels & Adrian, LLP

(57) ABSTRACT

A controller selects a shift map for deriving the shift timing of an automatic transmission according to output signals from a front seat seating sensor, a pillion seating sensor and a carrier loading sensor. The controller switches the shift map of a standard type to an output-emphasizing type shift map when the seating of the rider is sensed and at least one of the seating of the passenger and the loading on the carrier is sensed. The controller judges the seating of the rider or the loading of the cargo when a load equal to or exceeding a predetermined value is continuously applied to each load sensor for predetermined time or longer. Load sensors that can measure weight are used and a shift map may be also selected based upon a total value of loaded weight.

5 Claims, 8 Drawing Sheets

SHIFT MAP SWITCHING CONTROL UNIT

TECHNICAL FIELD

The present invention relates to a shift map switching control unit, particularly relates to a shift map switching control unit that can switch shift maps of an automatic transmission according to an output signal from a load sensor.

BACKGROUND OF THE INVENTION

Configurations in which shift maps for determining shift timing can be switched according to a change in a running condition and a rider's intention in a shift control unit of an automatic transmission is hitherto known. Operation for switching the shift maps is arbitrarily performed by a rider and in addition, a technique for automatically switching them based upon output values from various sensors is well-known.

In JP-A No. S63-254257, in a shift control unit provided with a shift map in which fuel economy is emphasized (an economical mode) and a shift map in which engine performance is emphasized (a power mode), it is disclosed that the power mode is selected only when a condition in which an angle of a throttle operated by a rider is equal to or larger than a set angle continuously for fixed time or longer.

However, according to the technique of JP-A No. S63-254257, control over switching the shift maps is made based upon an output signal of a throttle angle sensor and it is expected that optimum control can be made according to the existence of a passenger and/or a cargo.

The object of the invention is to address the above-mentioned problem of the related art and to provide a shift map switching control unit that can switch shift maps of an automatic transmission according to an output signal from a load sensor.

SUMMARY OF THE INVENTION

To achieve the object, the invention is based upon a shift map switching control unit provided with plural load sensors that sense the seating on a vehicle of a rider and passenger and the loading of cargo, plural shift maps for deriving the shift timing of the automatic transmission and a controller that selects one shift map out of the plural shift maps and controls the shift of the automatic transmission according to the one shift map, and has a first characteristic that the controller selects the one shift map according to output signals from the plural load sensors.

The invention has a second characteristic that at least one load sensor is attached inside a seat on which a rider is seated, a pillion on which a passenger is seated and a carrier on which cargo is loaded.

The invention has a third characteristic that the controller switches the one shift map to another shift map when the seating of the rider is sensed by the load sensor and at least one of the seating of the passenger and the loading on the carrier is sensed by the load sensor.

The invention has a fourth characteristic that the controller judges the seating of the rider and the passenger or the loading of a cargo when a load equal to or exceeding a predetermined value is continuously applied to the load sensor for predetermined time or longer.

The invention has a fifth characteristic that the controller calculates a total value of weight measured by the plural load sensors and selects the one shift map according to the total value.

The invention has a sixth characteristic that the vehicle is a motorcycle or a three-wheeled vehicle provided with a power plant.

According to the first embodiment, as the controller selects one shift map according to output signals of the plural load sensors, a suitable shift map is automatically selected according to a loaded condition of the vehicle and hereby, even if the loaded condition of the vehicle varies, the vehicle can be ordinarily driven according to an optimum shift map.

According to the second embodiment, because at least one load sensor is attached inside each of the seat on which the rider is seated, the pillion on which the passenger is seated and the carrier for loading a cargo, the loaded condition of the vehicle can be accurately sensed.

According to the third embodiment, because the controller switches one shift map to another shift map when the load sensor senses the seating of the rider and senses at least one of the seating of the passenger and the loading on the carrier, operation feeling of a throttle is also not greatly changed when two persons ride and a cargo is loaded, and the similar smooth acceleration compared to that when one person rides is enabled. When a shift map is the same though loaded weight is increased, the effect of deceleration by an engine brake is attenuated. However, when it is set that the shifted number of revolutions that proceeds downshifting by the switching of shift maps is slightly larger, the effect can be enhanced because an engine brake is applied earlier.

According to the fourth embodiment, because the controller judges a seated condition of the rider and the passenger or a loaded condition of a cargo when a load equal to or exceeding the predetermined value is continuously applied to the load sensor for the predetermined time or longer, the variation of the output of the load sensor caused when the rider puts his/her hand on the seat, or when the cargo is temporarily placed on the seat can be prevented from being judged as the seating of the rider or the loading of the cargo, and operation for switching the shift maps can be prevented from being frequently performed.

According to the fifth embodiment, because the controller calculates the total value of weight measured by the plural load sensors and selects one shift map according to the total value, a suitable shift map according to the weight loaded on the vehicle can be automatically selected. More precise control over switching the shift maps is enabled by subdividing the classification of weight for switching the shift maps.

According to the sixth embodiment, the shift map switching control unit according to the invention can be applied to a motorcycle and a three-wheeled vehicle provided with a power plant.

BRIEF DESCRIPTION OF THE DRAWINGS

A preferred embodiment of the present invention will be described with reference to the accompanying drawings, wherein.

DETAILED DESCRIPTION OF THE INVENTION

Figure 1:
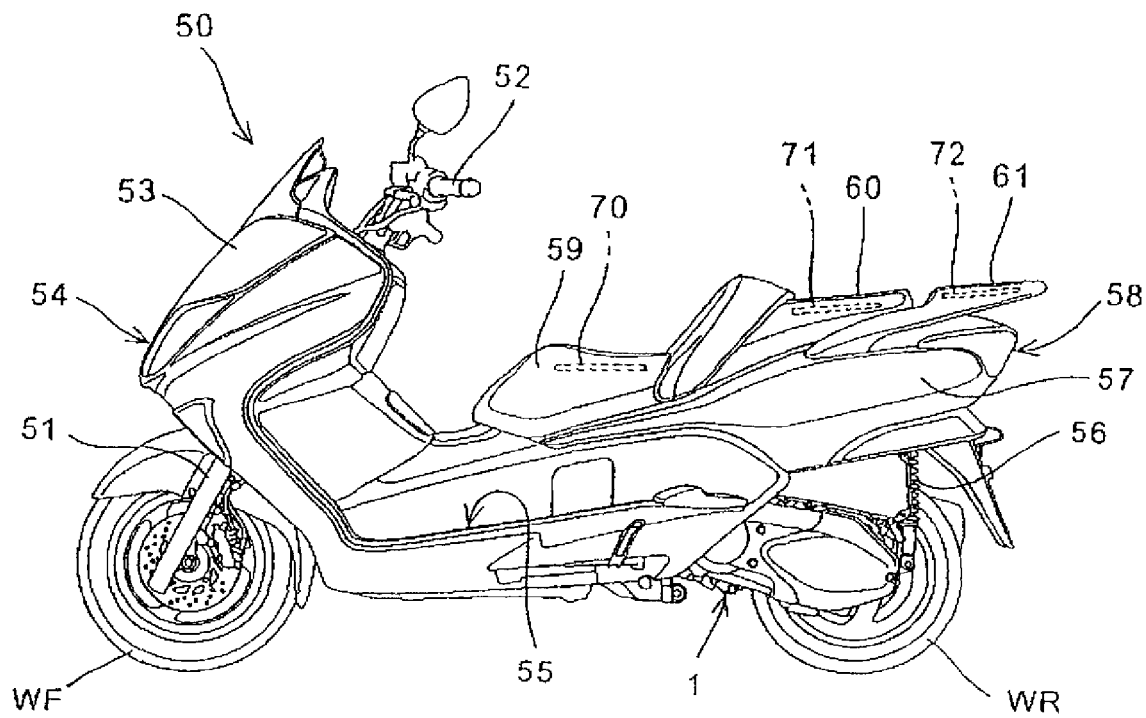
FIG. 1 is a side view showing a motorcycle equivalent to one embodiment of the invention.

Referring to the drawings, a preferred embodiment of the invention will be described in detail below. FIG. 1 is a side view showing one embodiment of a motorcycle to which the invention is applied. The scooter-type motorcycle 50 is provided with a swing type power unit 1 housing a continuously variable automatic transmission to which continuous shift control is automatically applied. A pair of right and left front forks 51 that rotatably journal a front wheel WF are attached on the front side of the body of the motorcycle 50 so that the forks can be steered by a handlebar 52. A lower end of a front cowl 53 inside which a headlight unit 54 is buried is extended on the rear side of the body and is coupled to a pair of right and left footrests 55. A front end of the power unit 1 that rotatably journals a rear wheel WR is journaled by a body frame, and its rear end is suspended by a rear shock unit 56; thus, power unit is rockably attached to the body. A seat cowl 57 inside which a tail lamp unit 58 is buried is arranged over the rear shock unit 56, and a front seat 59 on which a rider is seated, a pillion 60 on which a passenger is seated and a carrier 61 as a cargo bed are attached above the seat cowl 57. A front seat seating sensor 70 as a load sensor that senses that the rider is seated is arranged inside the front seat 59, a pillion seating sensor 71 as a load sensor that senses that the passenger is seated is arranged inside the pillion 60, and further, a carrier loading sensor 72 as a load sensor that senses that a cargo is loaded is arranged inside the carrier 61.

Figure 2:
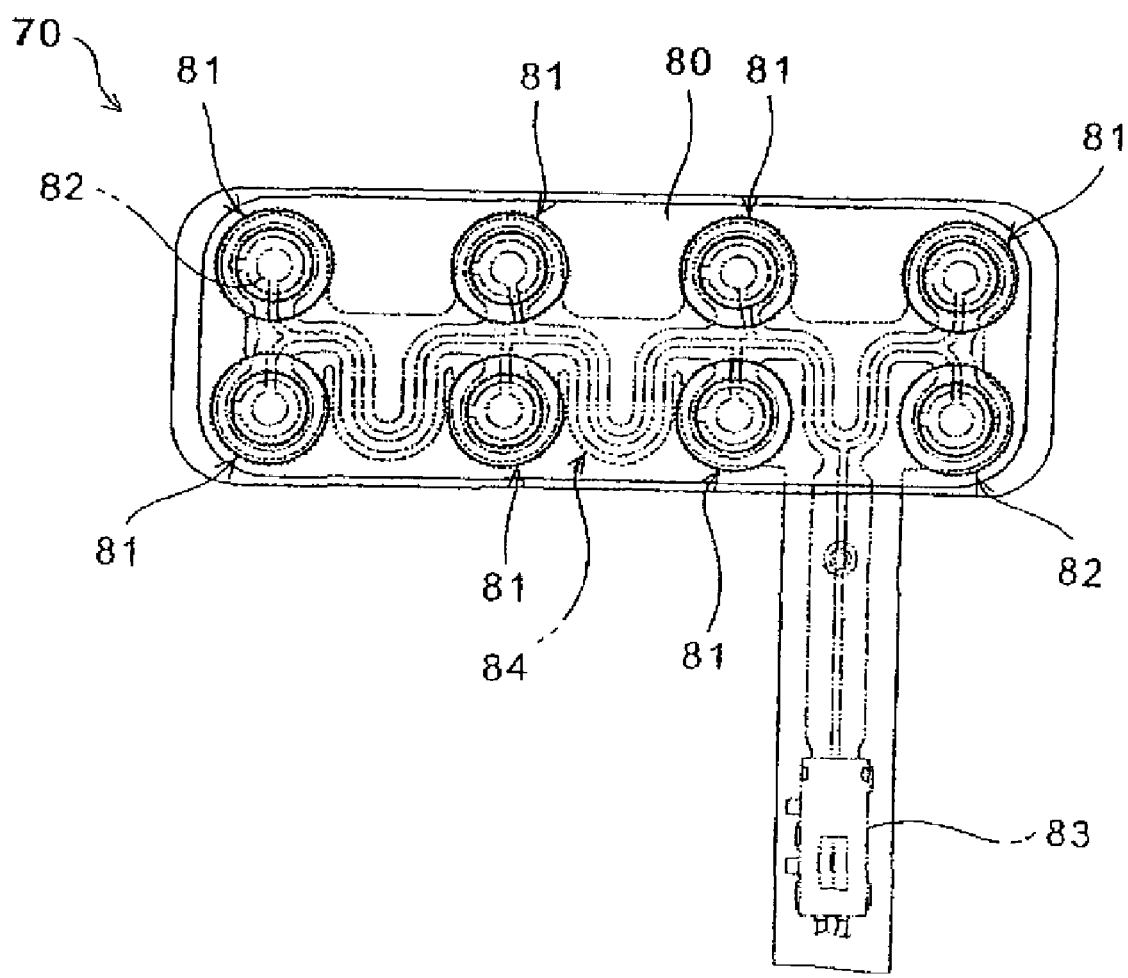
FIG. 2 is a top view showing a load sensor equivalent to one embodiment of the invention.

FIG. 2 is a top view showing the front seat seating sensor 70. The sheet-type front seat seating sensor 70 is acquired by covering a sensor body 84 including eight contact points 82 and wiring with a sensor cover 80 made of resin such as rubber. A convex portion 81 for concentrating a load of seating in a position corresponding to each contact point 82 is formed on the surface of the sensor cover 80 so as to enhance the sensitivity of the sensor. The sensor body 84 is formed by sealing each contact point 82 between vertical two-layer sheets made of a polyester film or others. For example, for the contact point 82, a membrane switch in which electrode sheets come in contact to be on when a load exceeding a predetermined value may be formed by printing conductive paste via a screen, forming the vertical electrode sheets and placing a spacer between the electrode sheets.

In the front seat seating sensor 70 in this embodiment, the eight contact points 82 are connected in parallel, and when one is turned on, a switch is turned on, and its output signal is transmitted to an ECU (see FIG. 4) that executes control over the operation of an engine via a connector 83. The arrangement in two rows of the contact points 82 in a longitudinal direction of the body enables the precise sensing of seating even if a seating position varies in the longitudinal direction depending upon the build and the seated posture of the rider. The pillion seating sensor 71 and the carrier loading sensor 72 also have a similar configuration. When a load equal to or exceeding each predetermined value (for example, 40 kgf from the upside of the pillion) is applied and the contact points 82 are turned on, an output signal is transmitted to the ECU. A position and a method in which the load sensors 70 to 72 are placed may be varied, for example, the sensors may be also placed in the vicinity of the surface of the seat or between the bottom plate and a cushion member of the seat, and the carrier loading sensor 72 can be attached to a support or others of the carrier 61.

Figure 3:
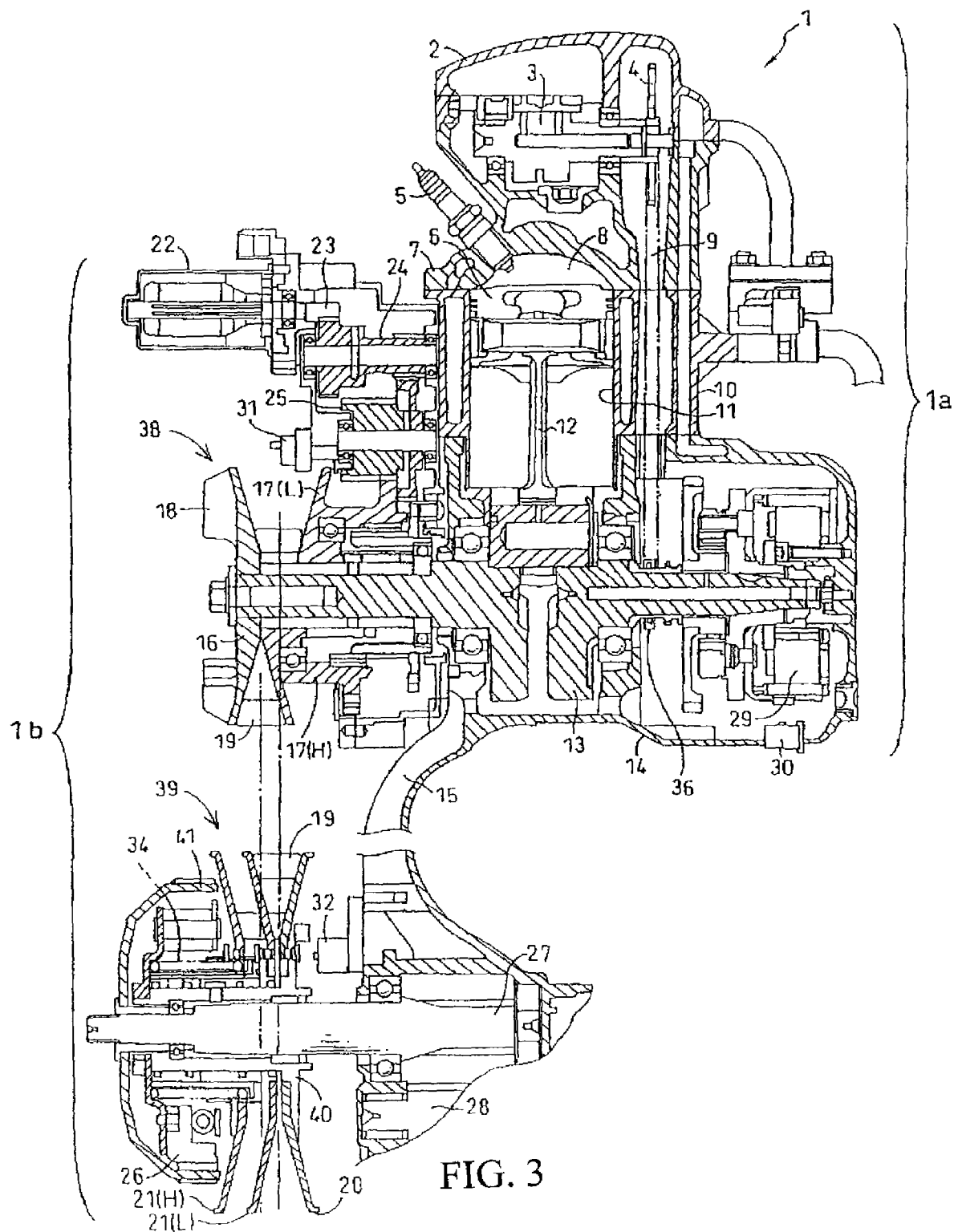
FIG. 3 is a sectional view showing a power unit of the motorcycle.

FIG. 3 is a sectional view showing the power unit 1. The power unit 1, in which the engine 1a as a power source and the automatic transmission 1b that transmits the driving force of the engine 1a to the rear wheel WR at an arbitrary gear ratio are integrated, is rockably coupled to a pivot in the rear of the body frame of the motorcycle 50 with a lateral direction in the drawing as a direction of the width of the body. A piston 6 is coupled to a crankshaft 13 that is an output shaft of the engine 1a via a connecting rod 12 and can be slid inside a cylinder 11 provided in a cylinder block 10. A cylinder head 7 is fixed to an upper end of the cylinder block 10 and a combustion chamber 8 for combusting air-fuel mixture is formed by the cylinder head 7, the cylinder 11 and the piston 6.

Valves (not shown) that control the intake and the exhaust of air-fuel mixture into/from the combustion chamber 8 and an ignition plug 5 for igniting the compressed air-fuel mixture are arranged in the cylinder head 7. The operation for opening and closing the intake/exhaust valves is controlled by the rotation of a camshaft 3 journaled by the cylinder head 7. A driven sprocket 4 is provided to a right end of the camshaft 3 over which a cylinder head cover 2 is arranged and a looped cam chain 9 is wound onto the driven sprocket 4 and onto a driving sprocket 36 installed on the crankshaft 13.

An ACG starter motor 29 rotated by the crankshaft 13 is housed at a right end of a crankcase 14 that journals the crankshaft 13 and in the vicinity of the ACG starter motor, a crankshaft position sensor (Ne sensor) 30 that detects the speed of the engine 1a based upon the number of revolutions of the ACG starter motor 29 is attached. In the meantime, the automatic transmission 1b including a driving-side pulley 38, a V-belt 19 and a driven-side pulley 39 is coupled to the left side of the crankshaft 13. A fan 18 for forcedly cooling at least the automatic transmission 1b by rotating the fan in synchronization with the crankshaft 13 is formed on the driving-side pulley 38. The automatic transmission 1b in this embodiment is a continuously variable belt converter in which the looped V-belt 19 is wound onto the driving-side pulley 38 connected to a left end of the crankshaft 13 and onto the driven-side pulley 39 mounted on a driving shaft 27 journaled in parallel with the crankshaft 13 within a transmission case 15 having a starting clutch 26. A gear ratio control motor 22 for arbitrarily varying gear ratio is provided in the vicinity of the driving-side pulley 38.

The driving-side pulley 38 is provided with a driving-side fixed pulley half 16 fixed to the left end of the crankshaft 13 and a driving-side movable pulley half 17 mounted slidably in an axial direction of the crankshaft 13. A feed screw is formed on the right side of the driving-side movable pulley half 17 and the driving-side movable pulley half 17 can be axially slid by the torque of the gear ratio control motor 22 transmitted via a pinion gear 23, a first transmission gear 24 and a second transmission gear 25. A gear ratio sensor 31 that detects gear ratio by sensing a position of the driving-side movable pulley half 17 is attached in the vicinity of the driving-side movable pulley half 17.

In the meantime, the driven-side pulley 39 is provided with a driven-side fixed pulley half 20 fixed to a sleeve 40 integrally rotated with a rotor that holds the starting clutch 26 and a driven-side movable pulley half 21 that can be slid in an axial direction of the sleeve 40. The V-belt 19 is wound onto each belt groove having a substantially V-type section respectively formed between the driving-side fixed pulley half 16 and the driving-side movable pulley half 17 and between the driven-side fixed pulley half 20 and the driven-side movable pulley half 21. A spring 34 that constantly presses the driven-side movable pulley half 21 toward the driven-side fixed pulley half 20 is arranged on the back side of the driven-side movable pulley half 21.

The starting clutch 26 cuts off the transmission of driving force between the driven-side pulley 39 and the driving shaft 27 when the number of revolutions of the driven-side pulley 39 is smaller than a predetermined value. When engine speed increases and the number of revolutions of the driven-side pulley 39 is equal to or larger than the predetermined value (for example, 3000 rpm), the starting clutch 26 is operated by centrifugal force and an inside face of an outer case 41 is pressed. Hereby, the rotation of the driven-side pulley 39 is transmitted to the outer case 41 via the starting clutch 26 thus rotating the driving shaft 27 fixed to the outer case 41, a transmission shaft 28 engaged with the driving shaft 27 and an axle (not shown) of the rear wheel WR engaged with the transmission shaft 28. A vehicle speed sensor 32 that detects the vehicle speed of the motorcycle 50 based upon the number of revolutions of the sleeve 40 is attached in the vicinity of the sleeve 40.

The change of gear ratio of the automatic transmission 1b is performed by rotating the gear ratio control motor 22 in a direction according to the increase or the decrease of gear ratio. In this embodiment, when a rotational direction of the gear ratio control motor 22 is equivalent to a shift raised direction (a top ratio direction), the driving-side movable pulley half 17 is slid in a left direction in the drawing. Hereby, as the driving-side movable pulley half 17 approaches the driving-side fixed pulley half 16 by slid quantity. The belt groove width of the driving-side pulley 38 decreases, a contact position of the driving-side pulley 38 and the V-belt 19 moves outward in a radial direction and a diameter in which the V-belt 19 is wound increases (in this drawing, a low ratio position 17(L) is shown on the upside of the crankshaft 13 and a top ratio position 17(H) is shown on the downside of the crankshaft 13).

According to the above-mentioned shift operation, force that tries to reduce the wound diameter operates because distance between the crankshaft 13 and the driving shaft 27 is unchanged in the driven-side pulley 39 and the V-belt 19 is looped. Therefore, the driven-side movable pulley half 21 is slid in the left direction in the drawing against resilient force produced by the spring 34 and groove width formed by the driven-side fixed pulley half 20 and the driven-side movable pulley half 21 increases. As described above, the change of gear ratio by the automatic transmission 1b is realized by continuously varying the diameter in which the V-belt 19 is wound (a transmission pitch diameter) and the automatic transmission 1b can continuously select an arbitrary gear ratio by controlling the gear ratio control motor 22. Therefore, the automatic transmission 1b sets some fixed gear ratios (for example, 7 stages) and may also execute automatic shift among the fixed gear ratios in addition to smooth driving by continuous shift. It can also execute shift control like a manual transmission, in which shift operation among the fixed gear ratios is performed by the rider.

Shift timing in the above-mentioned automatic shift control is determined according to a preset shift map. Normally, such a shift map is a three-dimensional map in which engine speed as a shift timing is derived using a throttle angle and vehicle speed as parameters. A shift map switching control unit according to the invention can be applied to various automatic transmissions such as a torque converter-type automatic transmission and a sequential multi-stage transmission in which shift operation is automatically performed, in addition to the continuously variable automatic transmission.

Figure 4:
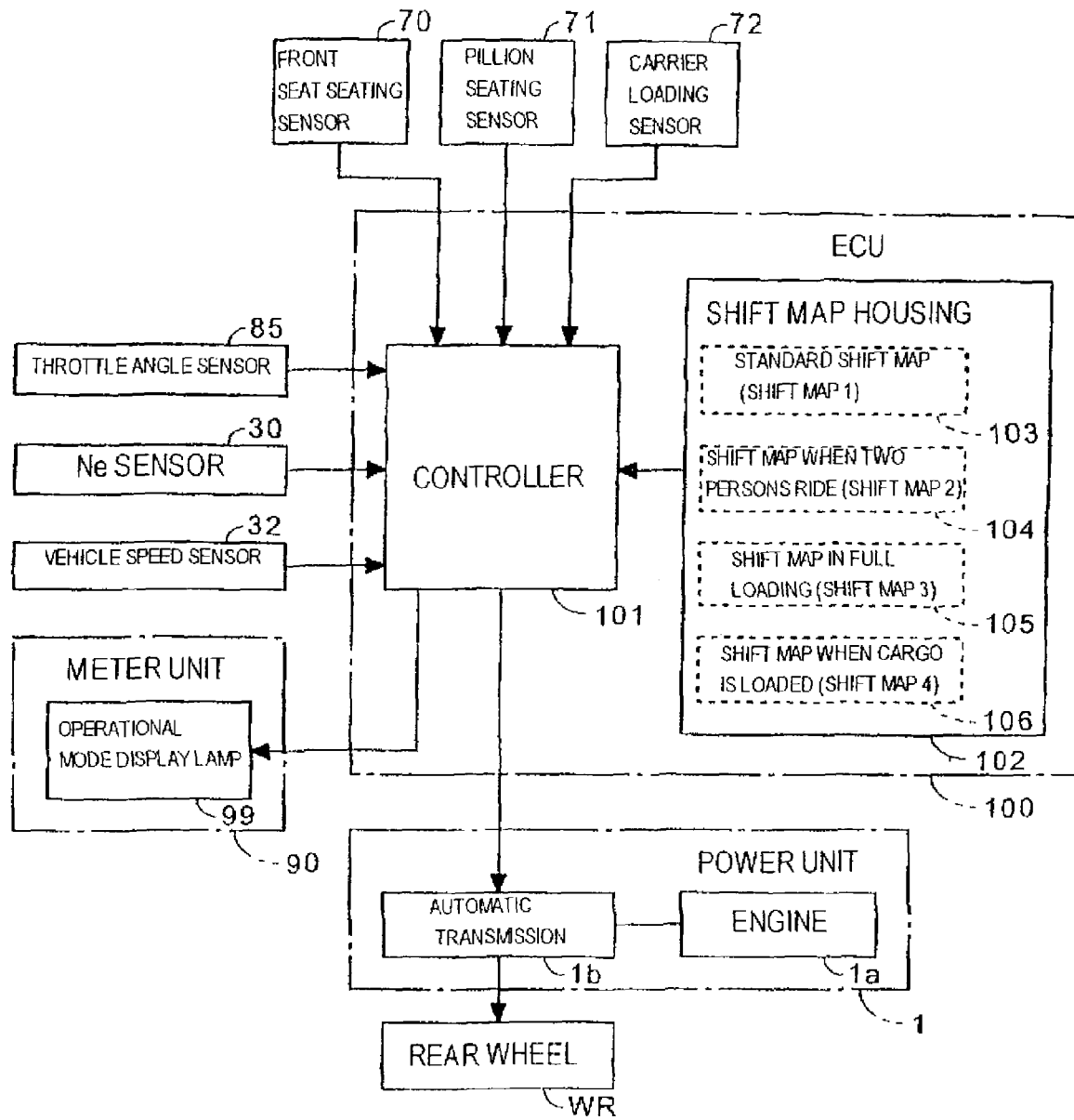
FIG. 4 is a block diagram showing a shift map switching control unit equivalent to one embodiment of the invention.

FIG. 4 is a block diagram showing the shift map switching control unit equivalent to one embodiment of the invention. The same reference numerals as the above-mentioned denotes the same or the similar parts. An engine control unit (ECU) 100 attached inside the body of the motorcycle 50 includes a controller 101 that controls the shift of the automatic transmission 1b and a shift map portion 102. In the shift map portion 102, a total of four shift maps are provided: a standard shift map 103 (a shift map 1), a shift map 104 when two persons ride (a shift map 2), a shift map in full loading (a shift map 3) and a shift map when a cargo is loaded (a shift map 4). Each output signal from a throttle angle sensor 85, the Ne sensor 30, the vehicle speed sensor 32, the front seat seating sensor 70, the pillion seating sensor 71 and the carrier loading sensor 72 is input to the controller 101. In a meter unit 90 driven according to a driving signal from the controller 101, an operational mode display lamp 99 is included. In this embodiment, the configuration including the three load sensors 70 to 72, the controller 101 and the shift map portion 102 is called the shift map switching control unit, however, the configuration as described above can be varied.

Figure 5:
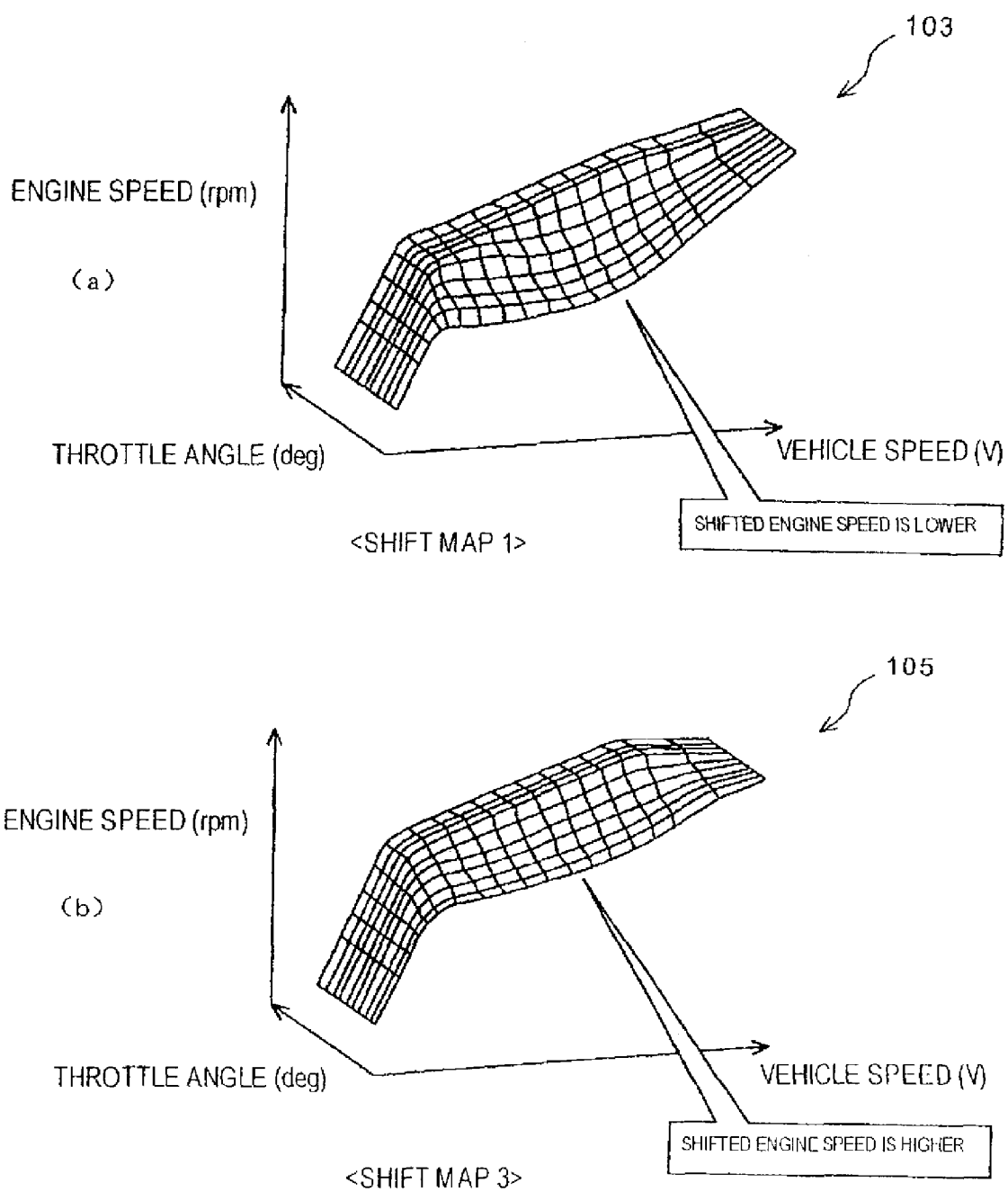
FIGS. 5(a) and 5(b) show one example of shift maps housed in a shift map housing.

FIG. 5 show the shift map 1 (FIG. 5a) and the shift map 3 (FIG. 5b) respectively provided in the shift map portion 102. The two shift maps are both three-dimensional maps for deriving engine speed as shift timing based upon the vehicle speed of the motorcycle 50 and a throttle angle. The shift map 1 is a standard type corresponding to a case that only the rider rides, while the shift map 3 is an output-emphasizing type shift map corresponding to a fully loaded condition in which a cargo is loaded in addition to the rider and a passenger. When both shift maps are compared, shifted engine speed in the shift map 3 is set so that it is higher than shifted engine speed in the shift map 1, in a case where vehicle speed and a throttle angle are the same. Therefore, when the shift map 3 is selected, a time for upshifting during acceleration is retarded, even when the rider performs the same operation of a throttle and the engine 1a is accelerated up to high revolution speed. Hereby, an acceleration characteristic of the motorcycle 50 is enhanced and in full loading, smooth acceleration, similar to that when only the rider rides, is also realized.

In this embodiment, the total of four shift maps including the shift map 2, having an intermediate characteristic between the shift map 1 and the shift map 3 and corresponding to the case that two persons ride, and the shift map 4, having a characteristic slightly closer to the output-emphasizing type shift map than the shift map 2 and corresponding to the case that the rider rides and a cargo is loaded, are prepared, and the shift maps are switched according to each output signal from the sensors 70 to 72.

Figure 6:
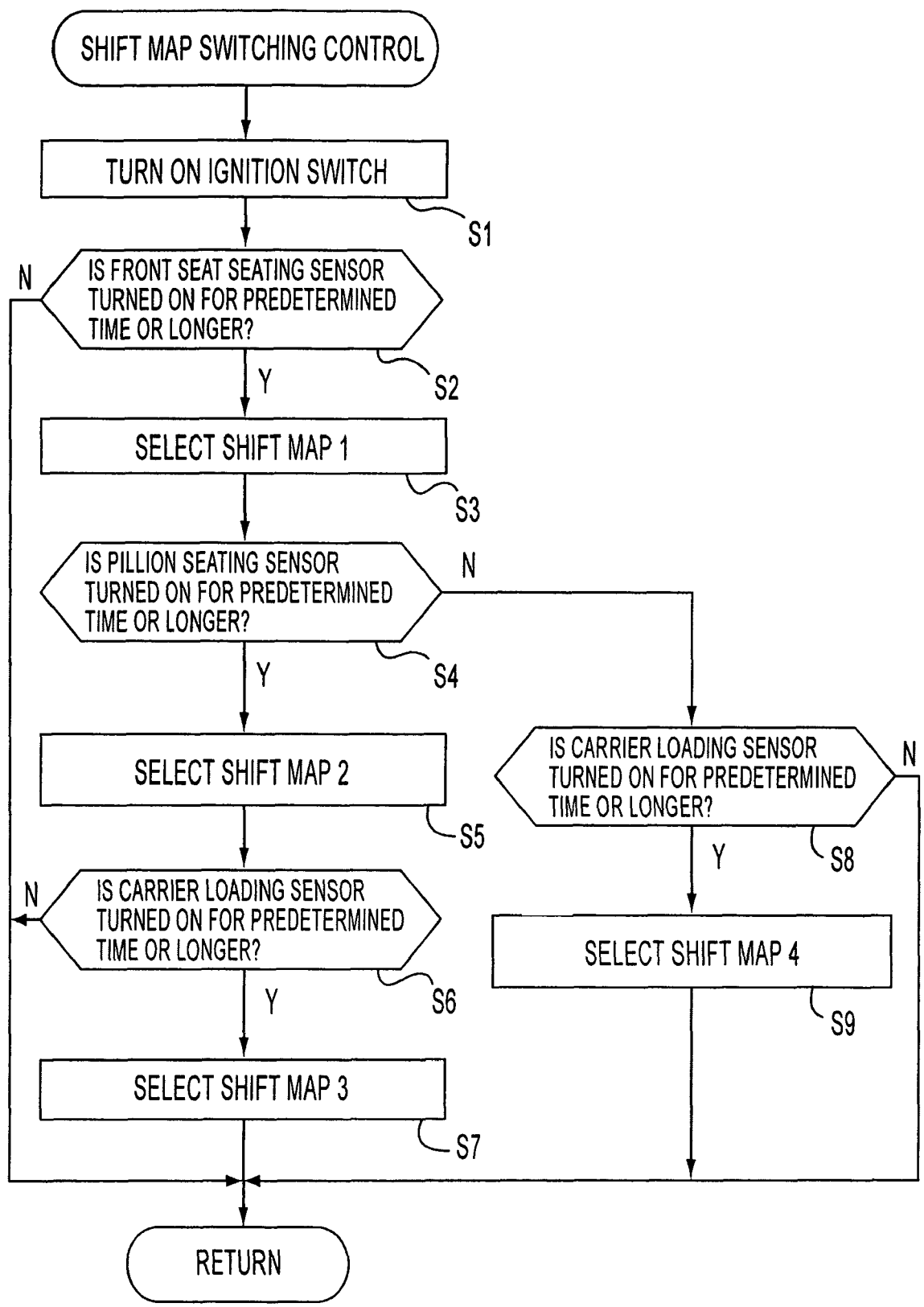
FIG. 6 is a flowchart showing a procedure for shift map switching control equivalent to one embodiment of the invention.

FIG. 6 is a flowchart showing a procedure for shift map switching control executed in the controller 101. When an ignition switch is turned on in step S1, it is determined in step S2 whether the front seat seating sensor 70 is turned on for predetermined time or longer. The predetermined time can be set to 30 seconds, for example. When an affirmative determination is made in step S2, control is passed to step S3 and the shift map 1 corresponding to the case that one person rides is selected. In the following step S4, it is determined whether the pillion seating sensor 71 is turned on for predetermined time or longer. When an affirmative determination is made, the control is passed to step S5, and the shift map 2 corresponding to the case that two persons ride is selected. In the following step S6, it is determined whether the carrier loading sensor 72 is turned on for predetermined time or longer. When an affirmative determination is made, the control is passed to step S7, and the shift map 3 is selected.

When a negative determination is made in step S4, the control is passed to step S8 and it is determined whether the carrier loading sensor 72 is turned on for the predetermined time or longer. When an affirmative determination is made in step S8, the shift map 4 corresponding to the case that one person rides and a cargo is loaded is selected in step S9. When a negative determination is made in step S9, the selection of the shift map 1 is maintained and the control is finished. In this flowchart, when the negative determination is made in step S2, that is, when it is determined that the front seat seating sensor is not turned on for the predetermined time, it is determined that no rider exists and the motorcycle 50 is not in a drivable condition and no shift map is selected. However, for example, a condition in which the shift map 1 is selected is made default and in determination for switching the shift map, only each output signal from the pillion seating sensor 71 and the carrier loading sensor 72 may be also used.

Figure 8:
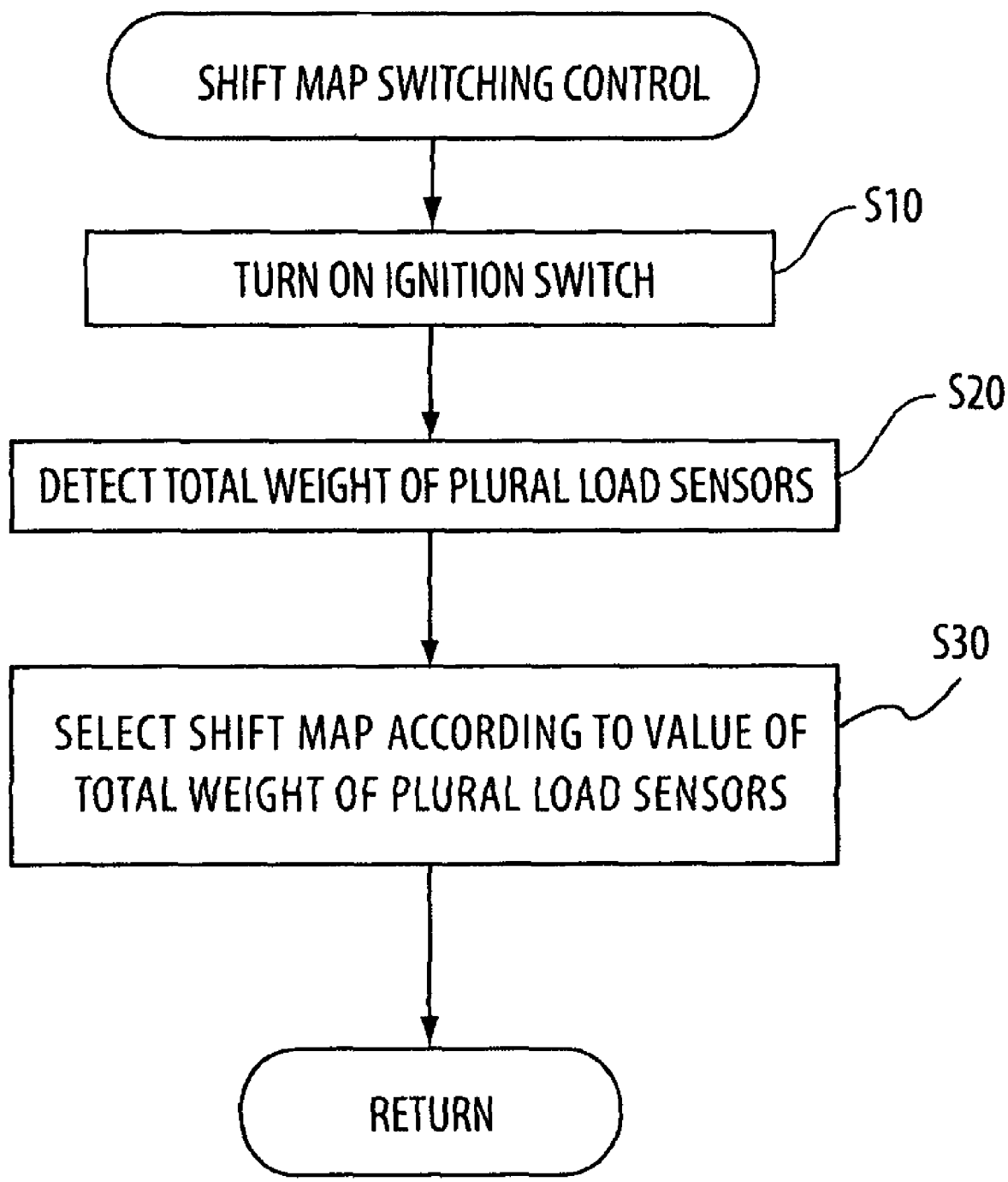
FIG. 8 is a flowchart showing a procedure for shift map switching control equivalent to a second embodiment of the invention.

In the above-mentioned embodiment, the switch switched from an off condition to an on condition when a load equal to or exceeding a predetermined value is applied to the load sensors 70 to 72 is used. However, this switch may be replaced with a load sensor that can measure weight such as a strain gauge and a load cell, and shift maps may be also switched according to a total value of weight measured by plural load sensors. In such shift maps switching control according to the measured value of weight, gradual switching to an output-emphasizing type shift map according to the increase of the total value of weight is enabled. An example of this is illustrated in FIG. 8. After turning on the ignition switch in step S10, the total weight of plural load sensors is detected in step S20. Then in step S30, it is determined whether the total weight is less than a first predetermined value. If yes, then shift map 1 is selected in step S60. If no, the system processed to step S40, where it is determined whether the total weight is less than a second predetermined value. If yes, then shift map 2 is selected in step S70. If no, the system processed to step S50, where it is determined whether the total weight is less than a third predetermined value. If yes, then shift map 3 is selected in step S80. If no, then shift map 4 is selected in step S90. In this example, the third predetermined value is greater than the second predetermined value and the second predetermined value is greater than the first predetermined value. In selecting a shift map according to an output signal from the load sensor, shift maps having various characteristics may be selected. For example, in a vehicle model which is provided with sufficient engine output, has a sport mode when one person rides and an output-emphasizing type shift map is set beforehand, the effect on the behavior of the body produced by the operation of the throttle can be reduced by switching to a shift map in which shifted engine speed is slightly lower when it is sensed that two persons ride.

Figure 7:
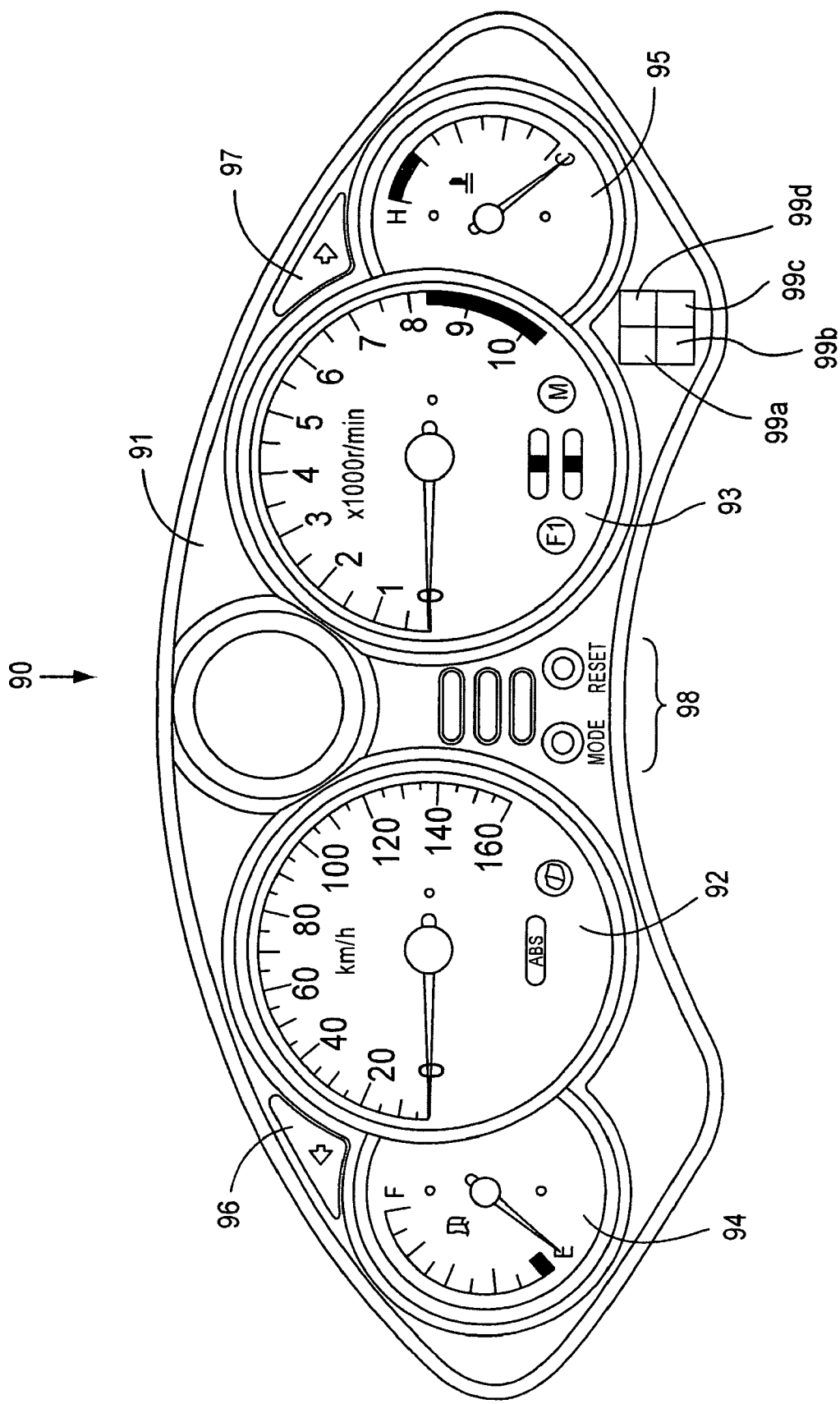
FIG. 7 is a front view showing a meter unit equivalent to one embodiment of the invention.

FIG. 7 is a front view showing the meter unit 90 arranged in the vicinity of the handlebar 52. The meter unit 90 houses a speedometer 92 operated according to an output signal from the vehicle speed sensor 32, a tachometer 93 operated according to an output signal from the Ne sensor 30, a fuel gauge 94 operated according to an output signal from a fuel level sensor (not shown), a water temperature gauge 95 operated according to an output signal from a coolant temperature sensor (not shown) attached to the engine 1a, turn signal lamp operating lamps 96, 97, an alarm lamp and a group of buttons 98 in a housing 91 made of resin or others. Operational mode display lamps 99a to 99d that display the currently selected shift map are arranged under the tachometer 93 and the water temperature gauge 95.

As for the four operational mode display lamps 99a to 99d, for example, when the shift map 1 is applied, the left upper lamp is lit, in the shift map 2, the right upper lamp is lit, in the shift map 3, the left lower lamp is lit, and in the shift map 4, the right lower lamp is lit. When the shift map 1 is switched to the shift map 3, the operational mode display lamp 99c corresponding to the shift map 3 is lit before actual switching and the rider may be also notified of the switching beforehand. Further, a liquid crystal display panel is provided and, for example, notice that because of a full loaded condition, the current mode is to be switched may be also displayed.

In the above-mentioned embodiment, the switch switched from an off condition to an on condition when a load equal to or exceeding a predetermined value is applied to the load sensors 70 to 72 is used. However, this switch may be replaced with a load sensor that can measure weight such as a strain gauge and a load cell, and shift maps may be also switched according to a total value of weight measured by plural load sensors. In such shift maps switching control according to the measured value of weight, gradual switching to an output-emphasizing type shift map according to the increase of the total value of weight is enabled. In selecting a shift map according to an output signal from the load sensor, shift maps having various characteristics may be selected. For example, in a vehicle model which is provided with sufficient engine output, has a sport mode when one person rides and an output-emphasizing type shift map is set beforehand, the effect on the behavior of the body produced by the operation of the throttle can be reduced by switching to a shift map in which shifted engine speed is slightly lower when it is sensed that two persons ride.

The configuration of the shift maps, the number housed in the shift map housing, the number and the configuration of the installed load sensors, a load value when the load sensor is turned on, the predetermined time required for the determination of switching and the display contents of the display that displays an applied condition of the shift maps are not limited to those in the embodiment and it need scarcely be said that various transformations are allowed. The shift map switching control unit according to the invention can be applied to various vehicles that control the shift of an automatic transmission according to a shift map.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A shift map switching control unit, comprising:
   a plurality of load sensors including a rider load sensor that senses the seating of a rider on a vehicle, a passenger load sensor that senses the seating of a passenger on the vehicle and a cargo load sensor that senses the loading of cargo on the vehicle;
   a plurality of shift maps for deriving shift timing of an automatic transmission, and
   a controller for selecting one shift map of said plurality of shift maps according to output signals from said plurality of load sensors, and controls the shift timing of the automatic transmission according to the selected one shift map,
   wherein said controller switches from the selected one shift map to another shift map when the seating of the rider is sensed by the rider load sensor and at least one of the seating of the passenger and the loading onto the carrier of the cargo is sensed by at least one of said plurality of load sensors.

2. The shift map switching control unit according to claim 1, wherein said rider load sensor is attached to a seat on which the rider is seated, said passenger load sensor is attached to a pillion on which said passenger is seated and said cargo load sensor is attached to a carrier that carries the cargo.

3. The shift map switching control unit according to claim 1, wherein said controller judges the seating of the rider, the seating of the passenger and the loading of the cargo when a load equal to or exceeding a predetermined value is continuously applied to said plurality of load sensors for a predetermined time or longer.

4. A shift map switching control unit, comprising:
a plurality of load sensors including a rider load sensor that senses the seating of a rider on a vehicle, a passenger load sensor that senses the seating of a passenger on the vehicle and a cargo load sensor that senses the loading of cargo on the vehicle;
a plurality of shift maps for deriving shift timing of an automatic transmission, and
a controller for selecting one shift map of said plurality of shift maps according to output signals from said plurality of load sensors, and controls the shift timing of the automatic transmission according to the selected one shift map,
wherein said controller calculates a total value of weight measured by said plurality of load sensors and selects the selected one shift map according to the total value, and
wherein said controller gradually switches from one shift map to another shift map according to an increase in the total value of the weight.

5. A shift map switching control unit, comprising:
a plurality of load sensors including a rider load sensor that senses the seating of a rider on a vehicle, a passenger load sensor that senses the seating of a passenger on the vehicle and a cargo load sensor that senses the loading of cargo on the vehicle;
a plurality of shift maps for deriving shift timing of an automatic transmission, and
a controller for selecting one shift map of said plurality of shift maps according to output signals from said plurality of load sensors, and controls the shift timing of the automatic transmission according to the selected one shift map,
wherein said rider load sensor is attached to a seat on which the rider is seated, said passenger load sensor is attached to a pillion on which said passenger is seated and said cargo load sensor is attached to a carrier that carries the cargo, and
wherein said controller calculates a total value of weight measured by said plurality of load sensors and selects the selected one shift map according to the total value, and
wherein said controller gradually switches from one shift map to another shift map according to an increase in the total value of the weight.

* * * * *